(12) United States Patent
Goldman et al.

(10) Patent No.: US 12,282,873 B2
(45) Date of Patent: *Apr. 22, 2025

(54) ON-DEMAND TRANSPORT SELECTION PROCESS FACILITATING THIRD-PARTY AUTONOMOUS VEHICLES

(71) Applicant: Uber Technologies, Inc., San Francisco, CA (US)

(72) Inventors: Brent Justin Goldman, San Francisco, CA (US); Neil Stegall, Pittsburg, CA (US); Leigh Gray Hagestad, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,063

(22) Filed: Nov. 28, 2023

(65) Prior Publication Data

US 2024/0104452 A1 Mar. 28, 2024

Related U.S. Application Data

(63) Continuation of application No. 17/817,238, filed on Aug. 3, 2022, now Pat. No. 11,868,928, which is a
(Continued)

(51) Int. Cl.
*G06Q 10/0631* (2023.01)
*G01C 21/28* (2006.01)
(Continued)

(52) U.S. Cl.
CPC ....... *G06Q 10/06311* (2013.01); *G01C 21/28* (2013.01); *G01C 21/3453* (2013.01); *G06Q 30/0284* (2013.01)

(58) Field of Classification Search
None
See application file for complete search history.

(56) References Cited

U.S. PATENT DOCUMENTS 7,212,984 B2 5/2007 Wolfe et al.
9,432,929 B1 * 8/2016 Ross ............... G08G 1/205
(Continued)

FOREIGN PATENT DOCUMENTS

EP 3874430 9/2021
WO 2011069170 6/2011
(Continued)

OTHER PUBLICATIONS

Patricfia "Transport-User Satisfaction Modelling—Application To the Brokerage Vehicle Selection Process", Jun. 2004, Centre for Transport Studies University College London, pp. 1-288 (Year: 2004).*

(Continued)

*Primary Examiner* — Romain Jeanty
(74) *Attorney, Agent, or Firm* — Schwegman Lundberg & Woessner, P.A.

(57) ABSTRACT

A network computing system can coordinate on-demand transport serviced by transport providers operating throughout a transport service region. The transport providers can comprise a set of internal autonomous vehicles (AVs) and a set of third-party AVs. The system can receive a transport request from a requesting user of the transport service region, where the transport request indicates a pick-up location and a destination. The system can determine a subset of the transport providers to service the respective transport request, and executing a selection process among the subset of the transport providers to select a transport provider to service the transport request. The system may then transmit a transport assignment to the selected transport (Continued)

provider to cause the selected transport provider to service the transport request.

20 Claims, 6 Drawing Sheets

Related U.S. Application Data continuation of application No. 16/665,650, filed on Oct. 28, 2019, now Pat. No. 11,423,340.

(60) Provisional application No. 62/751,921, filed on Oct. 29, 2018.

(51) Int. Cl.
  *G01C 21/34* (2006.01)
  *G06Q 30/0283* (2023.01)

(56) References Cited

U.S. PATENT DOCUMENTS

| | | | |
|---|---|---|---|
| 9,547,309 B2* | 1/2017 | Ross | G08G 1/20 |
| 9,557,183 B1* | 1/2017 | Ross | G06Q 50/40 |
| 9,786,187 B1 | 10/2017 | Bar-zeev et al. | |
| 10,036,641 B1 | 7/2018 | Iland et al. | |
| 10,552,773 B1 | 2/2020 | Shah et al. | |
| 10,832,294 B1 | 11/2020 | Bentley et al. | |
| 11,423,340 B2 | 8/2022 | Goldman et al. | |
| 11,868,928 B2 | 1/2024 | Goldman et al. | |
| 2009/0083111 A1 | 3/2009 | Carr | |
| 2012/0041675 A1 | 2/2012 | Juliver et al. | |
| 2013/0246301 A1 | 9/2013 | Radhakrishnan et al. | |
| 2015/0262430 A1 | 9/2015 | Farrelly et al. | |
| 2016/0209839 A1 | 7/2016 | Hoareau et al. | |
| 2016/0247106 A1* | 8/2016 | Dalloro | G05D 1/0297 |
| 2016/0307289 A1 | 10/2016 | Choksi et al. | |
| 2016/0332535 A1* | 11/2016 | Bradley | G05D 1/0276 |
| 2016/0334797 A1* | 11/2016 | Ross | G08G 1/202 |
| 2017/0162057 A1* | 6/2017 | Ross | G01S 17/89 |
| 2017/0351987 A1 | 12/2017 | Liu | |
| 2018/0060778 A1* | 3/2018 | Guo | G01C 21/3667 |
| 2018/0061242 A1 | 3/2018 | Bavar et al. | |
| 2018/0088749 A1 | 3/2018 | Yamashita et al. | |
| 2018/0137593 A1* | 5/2018 | Djuric | G06Q 50/40 |
| 2018/0342165 A1 | 11/2018 | Sweeney et al. | |
| 2019/0026796 A1 | 1/2019 | Dinis Da Silva De Carvalho | |
| 2019/0146509 A1* | 5/2019 | Dean | G05D 1/0214 701/25 |
| 2020/0082314 A1 | 3/2020 | Crapis et al. | |
| 2020/0134525 A1 | 4/2020 | Goldman et al. | |
| 2023/0057907 A1 | 2/2023 | Goldman et al. | |

FOREIGN PATENT DOCUMENTS

| | | | | |
|---|---|---|---|---|
| WO | WO-2016183525 A1 * | 11/2016 | ............ | B60W 30/00 |
| WO | 2020092380 | 5/2020 | | |

OTHER PUBLICATIONS

"U.S. Appl. No. 16/665,650, Non Final Office Action mailed Nov. 12, 2021", 15 pgs.
"International Application Serial No. PCT US2019 058580, International Search Report mailed Mar. 13, 2020", 3 pgs.
"International Application Serial No. PCT US2019 058580, Written Opinion mailed Mar. 13, 2020", 5 pgs.
"International Application Serial No. PCT US2019 058580, International Preliminary Report on Patentability mailed May 14, 2021", 7 pgs.
"U.S. Appl. No. 16/665,650, Response filed Feb. 14, 2022 to Non Final Office Action mailed Nov. 12, 2021", 14 pgs.
"U.S. Appl. No. 16/665,650, Notice of Allowance mailed Apr. 14, 2022", 11 pgs.
"U.S. Appl. No. 17/817,238, Preliminary Amendment filed Nov. 17, 2022", 8 pgs.
"U.S. Appl. No. 17/817,238, Non Final Office Action mailed Feb. 24, 2023", 15 pgs.
"U.S. Appl. No. 17/817,238, Examiner Interview Summary mailed May 9, 2023", 2 pgs.
"U.S. Appl. No. 17/817,238, Response filed May 24, 2023 to Non Final Office Action mailed Feb. 24, 2023", 11 pgs.
"U.S. Appl. No. 17/817,238, Notice of Allowance mailed Aug. 21, 2023", 10 pgs.
"U.S. Appl. No. 17/817,238, 312 Amendment filed Oct. 19, 2023", 8 pgs.
"U.S. Appl. No. 17/817,238, PTO Response to Rule 312 Communication mailed Oct. 24, 2023", 1 pg.
Bosch, Patrick M, "Autonomous vehicle fleet sizes required to serve different levels of demand", ETH Library, (Mar. 2016), 1-19.
Lam, Albert Y.S., "Autonomous Vehicle Public Transportation System", International Conference on Connected Vehicles and Expo (ICCVE), (Dec. 2014), 571-576.
U.S. Appl. No. 16/665,650 U.S. Pat. No. 11,423,340, filed Oct. 28, 2019, On-Demand Transport Selection Process Facilitating Third-Party Autonomous Vehicles.
U.S. Appl. No. 17/817,238 U.S. Pat. No. 11,868,928, filed Aug. 3, 2022, On-Demand Transport Selection Process Facilitating Third-Party Autonomous Vehicles.

* cited by examiner

ON-DEMAND TRANSPORT SELECTION PROCESS FACILITATING THIRD-PARTY AUTONOMOUS VEHICLES

PRIORITY CLAIM

The present application is a continuation of and claims the benefit of priority of U.S. application Ser. No. 17/817,238, filed Aug. 3, 2022, which is a continuation of and claims the benefit of priority of U.S. application Ser. No. 16/665,650, filed Oct. 28, 2019, which is based on and claims the benefit of United States Provisional 62/751,921 having a filing date of Oct. 29, 2018, each of which is incorporated by reference herein.

BACKGROUND

Vehicle ride-sharing platforms connect requesting users with available transport providers within any given transport service region (e.g., a metroplex such as the San Francisco Bay Area). For example, users can launch a ride service application on their mobile computing devices, which can enable them to configure and submit transport requests for a ride to any destination address within the transport service region. A backend computing system can process any given request by matching the user with a proximate available transport provider to transport the user to the desired destination.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
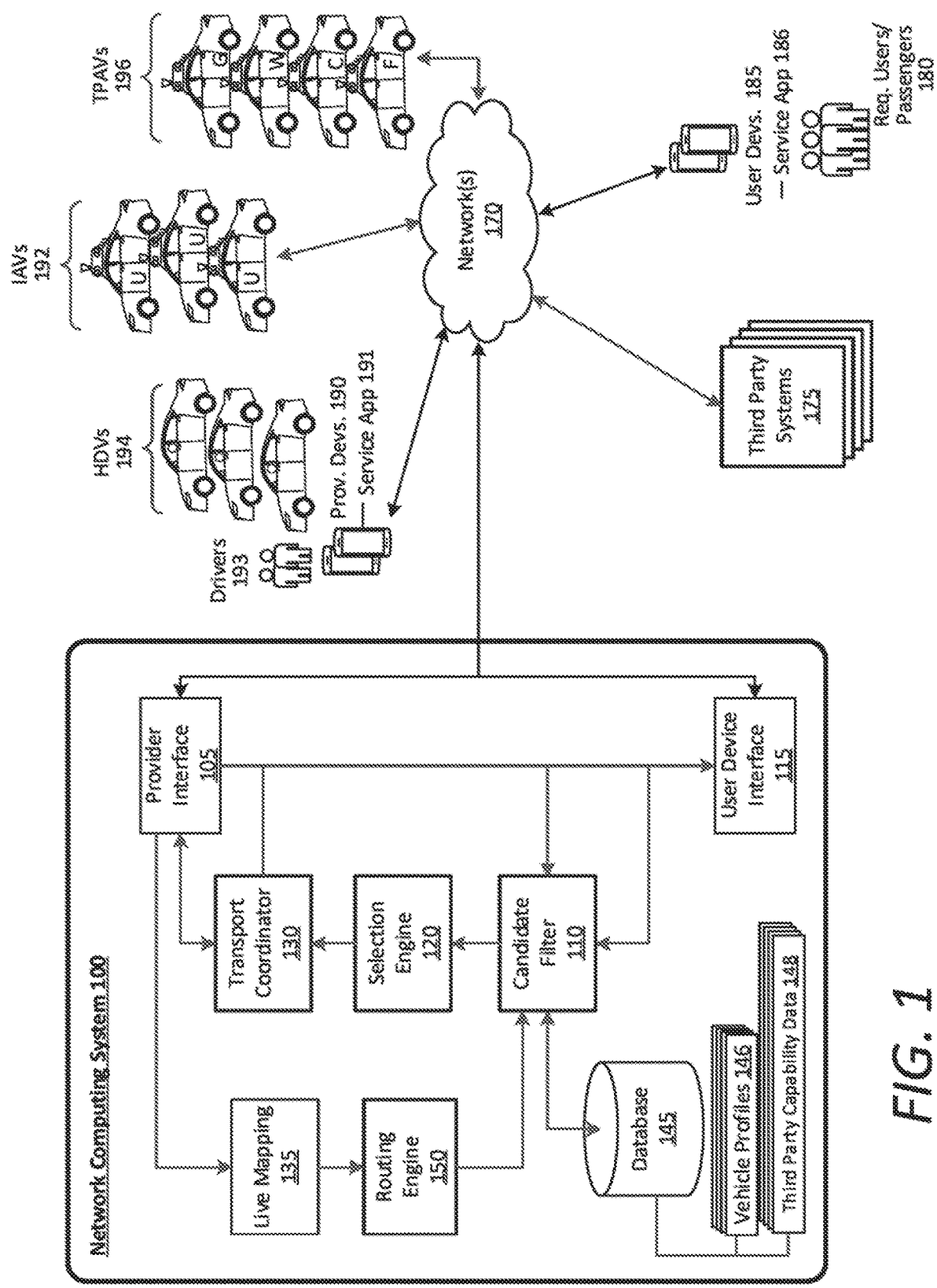
FIG. 1 is a block diagram illustrating an example computing system in communication with users and transport providers, in accordance with examples described herein.

A network computing system that manages and coordinates a vehicle ride-sharing platform is described herein. The network computing system can include a communication interface communicating over one or more networks with computing devices of requesting users and transport providers throughout a transport service region. For example, the communication interface can comprise an application programming interface that links the network computing system to transport service applications executing on computing devices, such as mobile computing devices (e.g., smartphones, wearable computing devices, tablet computers, augmented reality devices, personal computers, etc.), and on-board computing systems of vehicles (e.g., AVs). The designated transport service application can comprise a vehicle-ride sharing platform managed and coordinated by an on-demand transport service entity that administrates the network computing system described throughout the present disclosure.

As provided herein a "third-party AV" comprises an AV managed, operated, or provided by a third-party entity distinct from the provider of the vehicle ride-sharing platform. An "internal AV" comprises an AV managed or provided by the provider of the vehicle ride-sharing platform. For example, the vehicle ride-sharing platform can be managed and coordinated by UBER TECHNOLOGIES, of San Francisco, California, which can manage its own fleet of internal AVs owned, leased, and or otherwise operated by UBER. According to embodiments provided herein, the network computing system can facilitate third-party AVs in providing ride-sharing services throughout the transport service region. In doing so, the third-party AVs can execute the transport service application administered by the on-demand transport service entity that corresponds to the network computing system. Execution of the transport service application can cause the third-party AV to transmit location data to the network computing system, which enables the computing system to track the location of third-party AV throughout the transport service region and include the third-party AV in candidate sets of vehicles available to service transport requests from users.

Numerous challenges exist with the incorporation of third-party AV fleets into an on-demand transport service which provides its own internal fleet of AVs, and in various examples, incorporates human-driven vehicles into any given candidate set of transport providers competing to service a given transport request. For example, on-board routing software and operational autonomy grids of third-party AVs (e.g., a mapped road network on which the third-party AVs are operational) may differ from that of internal AVs. Furthermore, such on-board routing software and autonomy maps may remain proprietary despite the common use of a ubiquitous ride-sharing application as a platform for providing on-demand transport services. Other challenges can include trust in third-party AV capability in servicing a given ride request on a given route, and reliability of third-party AVs in completing matched rides for the user base of the on-demand transport service.

To address and overcome these challenges, the network computing system can coordinate on-demand transport for the transport service region by determining the capability of each third-party AV in servicing an individual transport request. Specifically, transport requests are intrinsically unique in that they typically correspond to unique pick-up locations (e.g., a user's household address) and a countless variety of possible destinations. Furthermore, while the capability of an internal AV in servicing a transport request may be known, the network computing system can perform a number of processes described herein to attain relative certainty in the capability and other potential advantages of third-party AVs in servicing such transport requests.

According to examples described herein, the network computing system can receive transport requests from requesting user of the transport service region. In various examples, each transport request can indicate a pick-up location and a destination. For each transport request, the network computing system can determine a subset of transport providers to service the respective transport request. This subset can comprise any number of internal AVs, third-party AVs, and/or human-driven vehicle, and may be determined based on a proximity to the pick-up location (e.g., a radius of two miles), an estimated time of arrival (ETA) to the pick-up location (e.g., given current traffic conditions and routing), estimated time to drop-off of the requesting user (ETD), and/or supply-demand conditions proximate to each transport provider in the vicinity of the pick-up location.

In various examples, once the subset of transport providers is determined, the network computing system can execute a selection process among the subset of the transport providers to ultimately select a transport provider to service the transport request. In certain aspects, the selection process can comprise an auction in which a variety of utility metrics are considered to determine an optimization score for each transport provider in the subset. Depending on the classification of each transport provider (e.g., whether the transport provider is an internal AV, third-party AV, or human-driven vehicle), the utility metrics for determining the optimization score can vary. For example, the utility metrics for a human-driven vehicle can comprise an earnings amount for the driver, and an ETA and/or ETD for rendezvousing with and/or dropping off the requesting user. For a third-party AV, the utility metrics can comprise information gathered from a capability response from the third-party AV, such as a proposed route and cost for servicing the transport request and the reliability of the vehicle and/or autonomous navigation systems, as well as the ETA and ETD of the third-party AV. For internal AVs, the utility metrics can further include values for testing or certifying new software versions, new hardware, new routes, and/or new vehicles.

For each vehicle in the subset of transport providers, the utility metrics may also include the supply-demand conditions surrounding the vehicle (e.g., the supply-demand conditions in the current sub-region of the vehicle and the supply-demand conditions in proximate surrounding sub-regions). For example, the network computing system can determine a coefficient or multiplier associated with moving the vehicle away from its current location to the pick-up location and/or destination. In general, this may be a negative value (e.g., if the vehicle would be moved from a supply scarce sub-region into a supply rich sub-region) or a positive value (e.g., if the vehicle would be moved from a supply rich sub-region into a supply scarce sub-region). Furthermore, the value itself may be calculated based on various factors such as a degree of supply scarcity of the current sub-region, destination sub-region, and/or any proximate surrounding sub-regions.

Factoring in each of the utility metrics for each transport provider in the subset, the network computing system can determine an optimization score of each of the transport providers in the subset, rank the subset accordingly, and select a transport provider to service the transport request based on the ranking (e.g., a vehicle having the highest optimization score). The network computing system may then transmit a transport assignment to the selected transport provider to cause the selected transport provider to service the transport request. In various examples, the capability queries transmitted to the candidate third-party AVs for any given transport request can comprise an auction process (e.g., such as a Dutch auction) that enables the network computing system to gauge whether any of the third-party AVs will be able to service the transport request more competitively or with higher optimization score than an internal AV or a human-driven vehicle.

In certain aspects, a third-party entity that manages a fleet of third-party AVs may share the on-board routing information of its third-party fleet with the network computing system, which can store the third-party, on-board routing information in a database for reference when determining capability of the third-party AVs in servicing transport requests. As provided herein, the on-board routing information can comprise data indicating the routes, roads, and/or lanes upon which the third-party AVs may operate within the transport service region. Additionally, over time, the network computing system can collect and compile service quality data of the third-party fleet for future reference in matching the third-party AVs with requesting users. As provided herein, the network computing system can determine the capability of each third-party AV in the fleet based on the stored on-board routing information and capability data, which can comprise historical data indicating the actual capabilities, any faults or problems, and whether such faults or problems have been solved.

For example, the network computing system can generate and transmit a capability query that includes the pick-up location and destination. The query can include an inquiry regarding an ETA to the pick-up location, an ETD, and/or a proposed route for the trip. In some aspects, the capability query can further include an estimated cost for completing the trip. The third-party AV can determine its own capability based on, for example, the on-board routing software and/or autonomy grid maps utilized by the third-party AV to operate throughout the transport service region. Furthermore, local factors such as how much power or fuel the vehicle current has, any current diagnostic issues, vehicle condition (e.g., cleanliness, tire or brake wear, etc.) can be considered by the third-party AV in determining its capability of servicing a particular transport request. Additionally or alternatively, given a pick-up location and/or destination, the network computing system can query a backend, third-party fleet management system that manages or otherwise provides the third-party AV fleet for transport services to determine the capability of the third-party AV in servicing a particular transport request.

It is further contemplated that any transport provider, whether human or AV, can respond to a transport assignment or invitation in the negative. For example, the network computing system can transmit transport invitations sequentially based on the ranked set of transport providers and receive a series of one or more negative responses until a transport provider responds in the affirmative. In this arrangement, the network computing system can match the first affirmatively responding transport provider in the ranked set to the transport request. Thereafter, the network computing system can monitor the en route progress of the transport provider to the rendezvous location with the requesting user, provide or facilitate remote assistance if needed, and facilitate a multi-trip ride to rendezvous with the user if the third-party or internal AV fails to complete the trip.

As provided herein, a transport request can comprise a request for passenger transport, comestible goods delivery, package or mail delivery, and the like. Accordingly, the network computing system described herein can apply classification filters to determine the candidate set of transport providers for any given request. In addition to being classified as a human-driven vehicle, an internal AV, or a third-party AV, each transport provider can be classified as one or more of a passenger transport provider, a food delivery provider, a package delivery provider, a mail delivery provider, and the like. Thus, when tracking transport providers throughout the given region, the network computing system can utilize the provider classifications in pre-filtering the transport providers for any given transport request.

Among other benefits, the examples described herein achieve a technical effect of incorporating third-party AVs that may include differing capabilities into a single vehicle ride-sharing platform. Through inclusiveness of a diverse field of AVs, the network computing system described herein may support convergence towards safer, more efficient, and more cost-effective solutions to the current challenges in autonomous driving technology. Furthermore, the selection processes based on the optimization scores described herein achieve an effect of routing transport supply efficiently and homogeneously throughout the transport service region to flatten transport supply-demand conditions over the entire region.

As used herein, a computing device refers to devices corresponding to desktop computers, computer servers, mobile computing devices or smartphones, laptop computers, tablet computing devices, virtual reality (VR) and/or augmented reality (AR) devices, wearable computing devices, etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, mobile devices or smartphones, tablet computers, laptop computers, virtual reality (VR) or augmented reality (AR) computers, and/or network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and non-transitory computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as within mapped autonomy grids or on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

Systems Description

FIG. 1 is a block diagram illustrating an example network computing system in communication with users and transport providers, in accordance with examples described herein. The network computing system 100 shown and described with respect to FIG. 1 can coordinate on-demand transport for a transport service region (e.g., a metropolitan area) by receiving transport requests from requesting users 180 and matching the transport requests with available transport providers. In various implementations, the network computing system 100 can include a user device interface 115 that connects with user devices 185 over one or more networks 170 via an executed service application 186 on the user devices 185. For example, a requesting user 180 can launch the service application 186 on the user device 185 to configure and transmit transport requests to the network computing system 100. The network computing system 100 can receive the transport requests at the user device interface 115. The network computing system 100 can further include a provider interface 105 that connects the network computing system 100 with various transport providers, which can comprise human drivers 193 operating human-driven vehicles 194, a fleet of internal AVs 192 associated with the on-demand transport service managed by the network computing system 100, and any number of fleets of third-party AVs 196 owned, managed, and/or provided by any number of third-party entities.

In various examples, the provider interface 105 can connect with provider devices 190 of human drivers 193 via an executed transport service application 191 on those devices 190. Additionally, the provider interface 105 can connect with the computing system of the internal AVs 192 and third-party AVs 196 based on a transport service application executing on the on-board computing systems of those AVs 192, 196. The various transport providers can transmit location data (e.g., GPS location pings) to the network computing system 100 to enable the network computing system 100 to track the locations of the transport providers as they operate throughout the transport service region. For example, the network computing system 100 can include a live mapping engine 135 that tracks the dynamic locations of the transport providers on map data as they operate throughout the region.

According to certain implementations, the network computing system 100 can include a candidate filter 110 that can process the transport requests received from the requesting users 180 and determine a set of candidate transport providers that can potentially service the transport request. For example, the candidate filter 110 can prefilter or eliminate any transport providers that are not within a threshold distance and/or projected time to the current location of the requesting user 180 or an inputted pick-up location indicated in the transport request. Accordingly, the candidate filter 110 can receive location data from the transport providers, and in certain variations, can further determine routing information for each remaining transport provider. For example, the network computing system 100 can include a routing engine 150 that can determine the most optimal routes of each transport provider in a candidate set of transport providers to rendezvous with the requesting user. Based on the routing data from the routing engine 150, the candidate filter 110 can determine estimated arrival times for each of the candidate transport providers.

In various examples, the candidate filter 110 can further communicate with each candidate transport provider to determine a capability of that transport provider in servicing the transport request. In some aspects, the candidate set of transport providers can include any combination of human driven vehicles 194, internal AVs 192, and/or third-party AVs 196. If the candidate set includes a number of third-party AVs 196, then the candidate filter 110 can transmit a capability query to each of the third-party AVs 196 to determine whether they are capable of servicing the transport request, and a proposed route and cost to complete the transport request. In doing so, the candidate filter 110 can transmit the pick-up location, the user's current location, a drop-off location, and/or a mandated route between the pick-up location and drop-off location. On board the third-party AV 196, the control system of the AV 196 can determine whether the AV 196 is capable, and if so, can transmit an affirmative response back to the candidate filter 110.

In certain examples, the third-party AV 196 can also transmit contextual information regarding a route plan, estimated time of completion, estimate cost of completion, and the like. In variations, the candidate filter 110 can transmit capability inquiries to third-party systems 175 corresponding to fleet management or ownership entities that provide the respective third-party fleets for transport services. In further variations, the candidate filter 110 can transmit capability queries to the third-party systems 175 to generally determine whether a particular third-party AV 196 can service a given transport request, and if so, the candidate filter can transmit a confirmation query to the third-party AV 196 to specifically determine whether that particular AV can service the request (e.g., given local conditions on the AV, such as fuel or power, a current number of passengers, and the like). Additionally or alternatively, the network computing system 100 can include a database 145 storing vehicle profiles 146 and/or third-party AV capability data 148 (e.g., on-board routing software information from third-party AVs 196) indicating whether a corresponding third-party AV 196 is capable of servicing a particular transport request. In such examples, the candidate filter 110 can reference the third-party capability data 148 and/or vehicle profiles 146 to filter out incapable third-party AVs to output a filtered set of transport providers.

According to various implementations, the candidate filter 110 can output a filtered set of candidate transport providers to a selection engine 120 of the network computing system 100 based on the capability responses from the third-party AVs 196 or the third-party systems 175. In certain aspects, the filtered set of transport providers can list each candidate vehicle with identifying information (e.g., type of vehicle, human-driven, internal AV, or third-party AV), an estimated time of completion, an estimated distance or time from the pick-up location, and the like. The candidate filter 110 may also provide capability response information from the third-party AVs in the candidate set, such as the proposed routes (e.g., to the pick-up location and to the destination) and the proposed cost of completion.

In certain implementations, the candidate filter 110 can initiate an auction process with the third-party AVs in the candidate set, such as a Dutch auction in which an initial price for servicing the transport request is proposed, and the third-party AVs 196 bid on the transport request. For example, the candidate filter 110 can determine a price for completing the transport request based on historical data of internal AVs 192 and/or human driven vehicles 194 servicing similar transport requests (e.g., based on distance and estimated time of completion). In one aspect, the candidate filter 110 can filter out all third-party AVs except for the lowest price AV, which can comprise the winner of the Dutch auction. In variations, third-party AVs that do not meet the initial price proposed by the candidate filter 110 may be filtered out of the candidate set. In certain implementations, the candidate filter 110 can enter into negotiations with a corresponding trip negotiator of the third-party AVs 196 to determine the candidate set. The candidate filter 110 may then associate each of the remaining third-party AVs in the candidate set with its submitted price, which, along with a proposed route, ETA, and ETD, can comprise a utility metric for the determination of the third-party AV's optimization score by the selection engine 120.

As described herein, selection of a transport provider in the candidate set can be based on the optimization score of each candidate. The network computing system 100 can include a selection engine 120 that determines an optimization score for each transport provider in the candidate set. In various aspects, the selection engine 120 can comprise processing resources (e.g., one or more processors, CPUs, GPUs, servers, datacenters, etc.), and can execute an instruction set, one or more algorithms, and/or a machine learning model to determine an optimization score for each transport provider in the candidate set based on a plurality of weighted utility metrics corresponding to and/or individual to the transport provider.

In certain implementations, each transport provider in a candidate set of transport providers can be classified as a human-driven vehicle 194, an internal AV 192, or a third-party AV 196. In some aspects, the transport providers may be further classified based on the available transport services provided (e.g., package delivery, comestible goods delivery, carpooling, luxury or professional transport services, high capacity vehicle service, and the like). The selection engine 120 can receive location and/or route data from each available and on-trip transport provider throughout the transport service region in order to determine the current supply conditions of each sub-region. For example, the entire transport service region can be parsed into any number of sub-regions, which can be evenly divided from the transport service region, or can vary in size based on such factors as population density, historical supply versus demand, and the like. For any given transport request that includes a pick-up location and destination, the selection engine 120 can determine a most optimal transport provider to service the transport request based on timing (e.g., ETA to the pick-up location and ETD to the destination given current or expected traffic conditions), earnings or cost, and a value associated with moving the transport provider from its current location within a particular sub-region to a sub-region that comprises the destination. For carpooling transport providers, the selection engine 120 can further factor in the addition of the pick-up location and destination as additional stops along an overall service route of the transport provider.

Based on the current location of each transport provider in the candidate set, the pick-up location and drop-off location of the transport request, the current transport supply versus transport demand conditions in the respective sub-regions of each transport provider in the candidate set, the transport supply versus transport demand conditions of the sub-regions corresponding to the pick-up location and the destination, the expected or predetermined earnings of the driver (e.g., for human-driven vehicles), the expected or predetermined cost for servicing the request for each third-party AV in the candidate set, and/or the overall conditions of the transport service region (e.g., identifying proximate sub-regions that are oversupplied or undersupplied), the selection engine 120 can determine an optimization score for each transport provider in the candidate set.

In certain implementations, the selection engine 120 can generally weigh more heavily in favor of lower cost and lower ETA and ETD transport providers. Furthermore, the selection engine 120 can generally weigh more heavily in favor of distributing transport providers from oversupplied sub-regions to undersupplied sub-regions. In further implementations, the selection engine 120 can further weigh more heavily in favor of individual third-party AVs and third-party entities with a proven track record of safety and robust autonomous systems. Accordingly, the optimization score of transport providers that have a relatively lower ETA to the pick-up location, a relatively lower ETD to the drop-off location, and are currently located in a sub-region that is more oversupplied than the destination of the requesting user, will be greater than the optimization score of transport suppliers that have higher ETAs and ETDs, and are currently located in undersupplied sub-regions. Once the selection engine 120 determines an optimization score for each transport provider in the candidate set, the selection engine 120 can rank the transport providers according to their optimization scores (e.g., from highest to lowest), and output the ranked set of candidate transport suppliers to the transport coordinator 130 of the network computing system 100.

The transport coordinator 130 can operate to ultimately select and invite a transport provider to service the transport request from the ranked set transport providers. In various examples, the transport coordinator 130 can sequentially transmit transport invitations to each transport provider in the ranked set in the order of the ranking until a ranked transport provider accepts the invitation. For example, the transport coordinator 130 can initially transmit a transport invitation to a highest ranked transport provider, and receive an invitation response either accepting or rejecting the invitation. If accepted, the transport coordinator 130 can match the transport request from the requesting user 180 with the highest ranked transport provider and enter an on-trip status for both. If rejected, then the transport coordinator 130 can transmit the invitation to a next highest ranked transport provider, and so on until a highest ranked, accepting transport provider accepts the invitation. Once accepted, the transport coordinator 130 can transmit match data to each of the accepting transport provider and the requesting user 180, and facilitate the rendezvous between them.

In variations, the transport coordinator 130 can take a highest subset of the ranked transport providers (e.g., the top three) and transmit a simultaneous transport invitation to them. In further variations, the transport coordinator 130 initially transmit the transport invitation to only the internal AVs 192 and the third-party AVs 196 in the ranked set of transport providers, and receive a set of invitation responses from those AVs. If none accept, then the transport coordinator 130 can transmit the invitation to one or more of the human drivers 193 in the ranked set. However, if one or more AVs accept, then the transport coordinator 130 can select one of the AVs to service the transport request (e.g., a highest ranked affirmative respondent). Alternatively, if one or more AVs accept, the transport coordinator 130 can determine whether the accepting AVs are ranked higher or lower than a human driver 193. If the accepting AVs are ranked higher, then the transport coordinator 130 can select from the accepting AVs to service the transport request. However, if the accepting AVs are ranked lower than one or more human drivers 193, then the transport coordinator 130 can transmit the invitation to the computing devices 190 of the higher ranked drivers 193. If a driver 193 accepts, then the transport coordinator 130 can match the accepting driver 193 with the requesting user 180 that submitted the transport request.

As described herein, for any given transport request, the candidate filter 110 can compile third-party capability data 148 regarding the capability of third-party fleets in servicing individual transport requests (e.g., based on capability responses received from the third-party AVs 196 and/or third-party systems 175). The third-party capability data 148 can indicate whether a whole fleet of third-party AVs should be disqualified or qualified as candidate vehicles for individual transport requests (e.g., based on a safety record). For example, the third-party capability data 148 can describe autonomy road networks (e.g., lane-specific routes) that a third-party fleet of AVs is capable of servicing. Thus, if a transport request requires a transport provider to travel outside the autonomy road network of a particular fleet, then the candidate filter 110 can disqualify all third-party AVs in that fleet. In addition, the selection engine 120 can factor experience and safety history of a third-party entity or third-party AV into the optimization score calculations.

In further examples, the candidate filter 110 can compile and access vehicle profiles 146 of individual third-party AVs 196. It is contemplated that AV technology may advance unevenly across fleets and within the fleets themselves. For example, AVs may run outdated software or carry outdated hardware, but may still be sufficiently reliable and safe for transport services. In various aspects, the vehicle profiles 146 can indicate the capability of individual AVs in servicing any given transport request. Accordingly, the candidate filter 110 can determine a candidate set of transport providers, comprising any combination of human-driven vehicles 194, internal AVs 192, and/or third-party AVs 196, and perform lookups of the vehicle profiles 146 of those candidate transport providers to determine whether each transport provider is individually capable of service the transport request. The selection engine 120 can perform lookups in the vehicle profiles to incorporate weighted utility metrics corresponding to the capability and/or safety of those individual vehicles (e.g., based on software, hardware, age of the vehicle, etc.).

It is contemplated herein that the utilization of the selection engine 120 in the selection process achieves a technical effect of remotely coordinating with and distributing transport supply across a given transport service region to effectively flatten supply conditions over the entire service region, add downward pressure on the cost of transport services, and bolster the safety of AV operations across multiple supplying entities. For example, the selection engine 120 can attribute higher optimization scores to vehicles in oversupplied regions, facilitating their general migration towards more undersupplied sub-regions.

Figure 2:
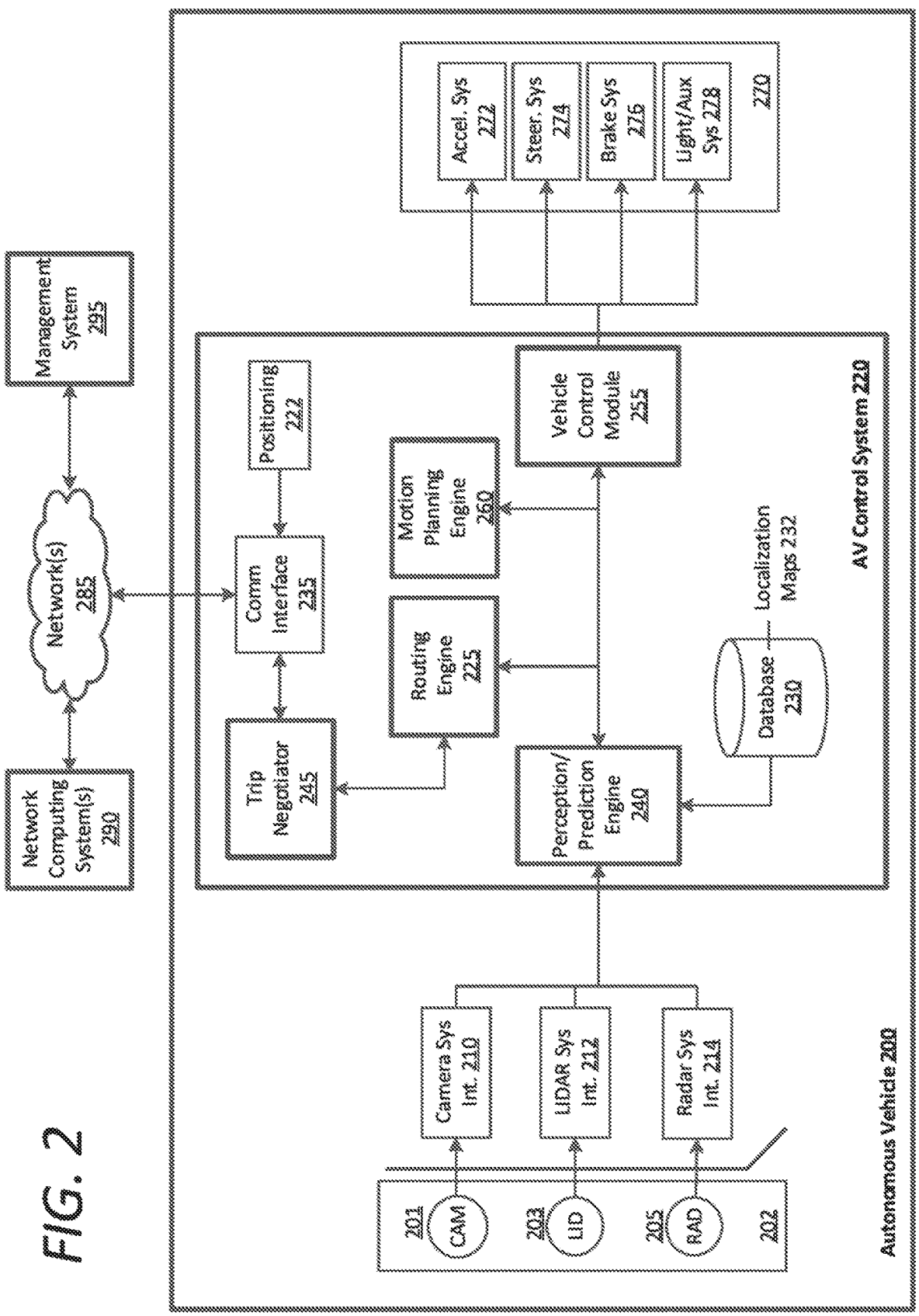
FIG. 2 is a block diagram illustrating an example autonomous vehicle (AV) operated by a control system implementing a trip negotiator, according to examples described herein.

FIG. 2 is a block diagram illustrating an example AV 200 operated by a control system 220, according to examples described herein. In an example of FIG. 2, a control system 220 can autonomously operate the AV 200 in a given geographic region, and can perform transport services (e.g., transport of humans, delivery services, etc.). In examples described, the AV 200 can operate without human control. For example, the AV 200 can autonomously steer, accelerate, shift, brake, and operate lighting components without human intervention. In certain variations, the AV 200 can switch between an autonomous mode, in which the AV control system 220 autonomously operates the AV 200, and a manual mode in which a driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processors and/or field programmable gate arrays (FPGAs)) which operate to process sensor data received from a sensor system 202 of the AV 200 that provides a sensor view of a road segment upon which the AV 200 operates. The sensor data can be processed to determine actions which are to be performed by the AV 200 in order for the AV 200 to continue along a current route to the destination. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands to control the various control mechanisms 270 of the AV 200, including the vehicle's acceleration system 272, steering system 274, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data from the sensor suite 202 and to control the various control mechanisms 270 in order to autonomously operate the AV 200. For example, the control system 220 can analyze the sensor data to generate low level commands executable by the acceleration system 272, steering system 274, and braking system 276 of the AV 200. Execution of the commands by the control mechanisms 270 can result in throttle inputs, braking inputs, and steering inputs that collectively cause the AV 200 to operate along sequential road segments to a particular destination.

In more detail, the sensor suite 202 operates to collectively obtain a sensor view for the AV 200 (e.g., in a forward operational direction, or providing a 360 degree sensor view), and to further obtain situational information proximate to the AV 200, including any potential hazards or obstacles. By way of example, the sensors 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic camera system 201 which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data to a perception/prediction engine 240 of the control system 220. In various implementations, the perception/prediction engine 240 can access a database 230 comprising stored localization maps 232 of the given region in which the AV 200 operates. The localization maps 232 can comprise detailed ground truth data of each road segment of the given region. For example, the localization maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception/prediction engine 240 can access a current localization map of a current road segment to compare the details of the current localization map with the sensor data in order to detect and classify any objects of interest, such as moving vehicles, pedestrians, bicyclists, and the like.

In various examples, the perception/prediction engine 240 can dynamically compare the live sensor data from the AV's sensor systems 202 to the current localization map as the AV 200 travels through a corresponding road segment. The perception/prediction engine 240 can flag or otherwise identify any objects of interest in the live sensor data that can indicate a potential hazard. In accordance with many examples, the perception/prediction engine 240 can output a processed sensor view indicating such objects of interest to a vehicle control module 255 of the AV 200. In further examples, the perception/prediction engine 240 can predict a path of each object of interest and determine whether the AV control system 220 should respond or react accordingly. For example, the perception/prediction engine 240 can dynamically calculate a collision probability for each object of interest, and generate event alerts if the collision probability exceeds a certain threshold. As described herein, such event alerts can be processed by the vehicle control module 255 that generates control commands executable by the various control mechanisms 270 of the AV 200, such as the AV's acceleration, steering, and braking systems 272, 274, 276.

On a higher level, the AV control system 220 can include a motion planning engine 260 that provides the vehicle control module 255 with a motion plan and a travel trajectory along a current route to a destination. The current route may be determined by a backend transport system, or may be determined by the AV 200 via access to a local or external mapping service. In some aspects, the AV 200 can include a user interface, such as a touch-screen panel or speech recognition features, which can enable a passenger to input a destination. In some aspects, the AV 200 may communicate with an on-demand transport management system that manages routing of any number of AVs operating throughout a given region to provide transportation services to requesting riders. Thus, the motion planning engine 260 may receive the destination from the on-demand transport system over the network(s) 285 in order to plan a current route for the AV 200.

In mapping the current route, the motion planning engine 260 can generally utilize an on-board mapping engine or an external mapping service by transmitting map calls over the network(s) 285 in order to determine a most optimal route plan from a current location of the AV 200 to the destination. This route plan may be determined based on distance, time, traffic conditions, additional pick-ups (e.g., for carpooling services), and the like. For each successive road segment on which the AV 200 travels, the motion planning engine 260 can provide trajectory data to the vehicle control module 255 to enable the vehicle control module 255 to operate the AV 200 safely to the next road segment or the destination. For example, the trajectory data can indicate that the vehicle control module 255 must change lanes or make a turn within the current localization map in order to proceed to the next road segment along the current route plan.

According to examples provided herein, the vehicle control module 255 can utilize the motion plan, the processed sensor view, and event alerts to autonomously operate the control mechanisms 270 of the AV 200. As an example, to make a turn based on the route plan, the vehicle control module 255 can generate control commands that cause the lights and auxiliary systems 278 of the AV 200 to activate the appropriate directional signal, the braking system 276 to slow the AV 200 down for the turn, the steering system 274 to steer the AV 200 into the turn, and the acceleration system 272 to propel the AV 200 when exiting the turn. In further examples, event alerts may indicate potential hazards such as a pedestrian crossing the road, a nearby bicyclist, obstacles on the road, a construction area, proximate vehicles, an upcoming traffic signal and signal state, and the like. The vehicle control module 255 can respond to each event alert on a lower level while, on a higher level, operating the AV 200 based on the motion plan determined by the motion planning engine 260.

According to examples described herein, the AV control system 220 can further include a routing engine 225, positioning module 222, and trip negotiator 245. The positioning module 222 can transmit positioning data (e.g., location pings) to the network computing system 290 to enable the computing system 290 to identify the AV 200 as a candidate for servicing transport requests. In doing so, the network computing system 290 can select the AV 200 as a candidate vehicle and as an optimal servicing vehicle to fulfill a given transport request in the manner described with respect to FIG. 1. The positioning module 222 can comprise one or more of a global positioning system (GPS) module, GLONASS module, DORIS chip, BeiDou COMPASS chip, GALILEO module, IRNSS module, QZSS, or any suitable satellite or ground positioning or navigation system.

In certain implementations, the routing engine 225 can access the localization maps 232 to determine a proposed route for servicing a particular transport request. For example, the network computing system 290 can transmit a capability inquiry to the trip negotiator 245, which can determine whether the AV 200 is able to service a given transport request, or in certain implementations, whether the transport request is desirable for the AV 200. In various aspects, given a received capability query, the trip negotiator 245 can query the routing engine 225 for a proposed route to pick-up the requesting user and transport the requesting user to the destination indicated in the transport request. In further implementations, the trip negotiator 245 can communicate with a management system 295, corresponding to a third-party system 175 that manages or owns the AV 200, to determine whether the management system 295 identifies the transport request as desirable for the AV 200 (e.g., based on cost, location, routing information, etc.).

If the transport request is undesirable, then the trip negotiator can transmit a rejection message to the network computing system 290 and await a next capability inquiry corresponding to another transport request. If the transport request is desirable, the trip negotiator 245 can transmit data indicating the propose route and/or cost for servicing the transport request back to the network computing system 290. In some aspects, the trip negotiator 245 transmit additional information that indicates an estimated time of completion to service the transport request, and other parameters that may make the trip more desirable for the requesting user (e.g., any on-board amenities or features).

In various embodiments, the network computing system 290 can ultimately decide whether the AV 200 is suitable or optimal for servicing a given transport request. The network computing system 290 can transmit an initial capability inquiry to the communication interface 235, which can be processed by the trip negotiator 245. The trip negotiator 245 can transmit data indicating a proposed route, estimated completion time, and/or a confirmation or rejection that the AV 200 is capable of servicing the request back the network computing system 290 to assist the network computing system 290 in making a final decision. If the AV 200 is most optimal, the network computing system 290 can transmit a transport invitation to the trip negotiator 245 to service the transport request, which the trip negotiator 245 may accept or decline.

It is contemplated that multiple on-demand transport servicing platforms may be utilized by the AV 200, and therefore multiple transport invitations may be received near simultaneously from multiple network computing systems 290 each managing their own on-demand transport service(s). Thus, if multiple transport invitations are received from multiple computing systems 290, the trip negotiator 245 and/or management system 295 of the AV 200 can select a most desirable transport invitation to accept and reject or cancel the others. It is further contemplated that the AV 200 can operate in an available mode, an on-trip mode, and an unavailable mode for any combination of transport service at any given time (e.g., passenger transport, carpool service, food delivery, package and mail delivery, and the like). Accordingly, the trip negotiator 245 can locally, or in concert with the management system 295, determine which requests and invitations to fulfill for which particular transportation services (e.g., based on actual or projected earnings).

Methodology

Figure 3:
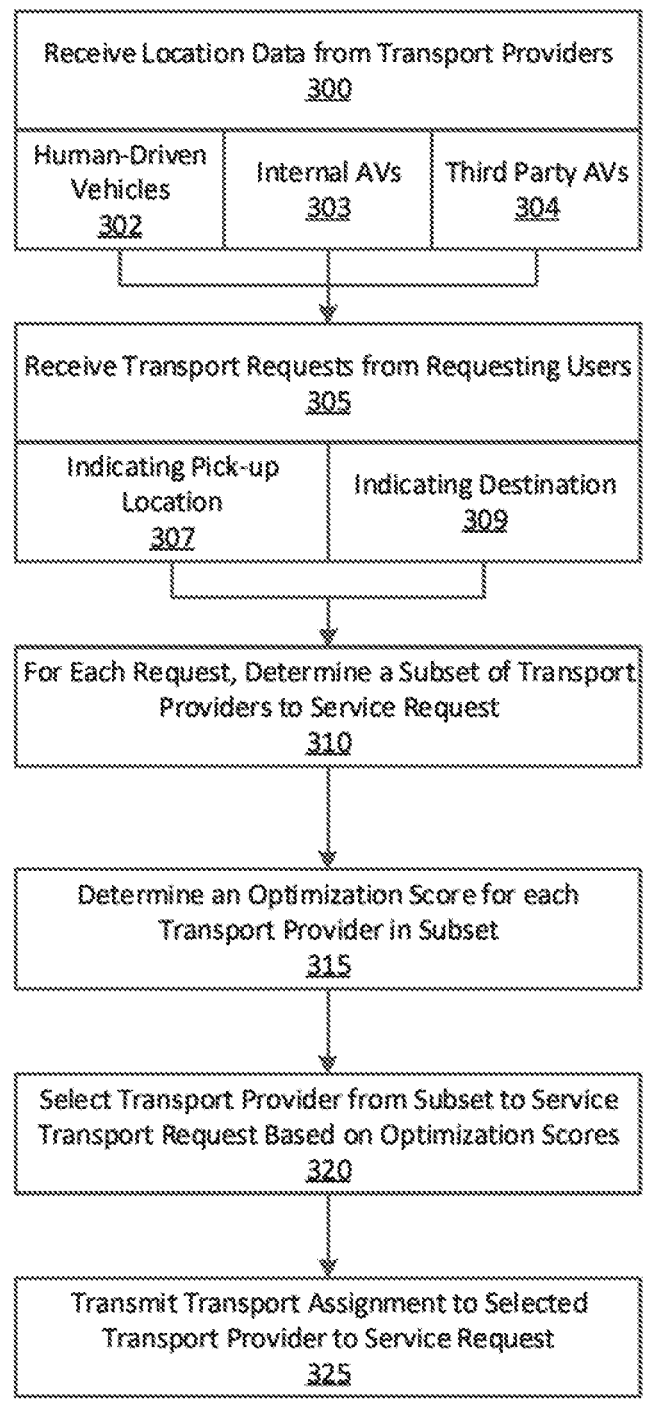
FIGS. 3 and 4 are flow charts describing example methods of determining optimization values for transport vehicles and selecting transport providers to service transport requests, according to examples described herein.
Figure 4:
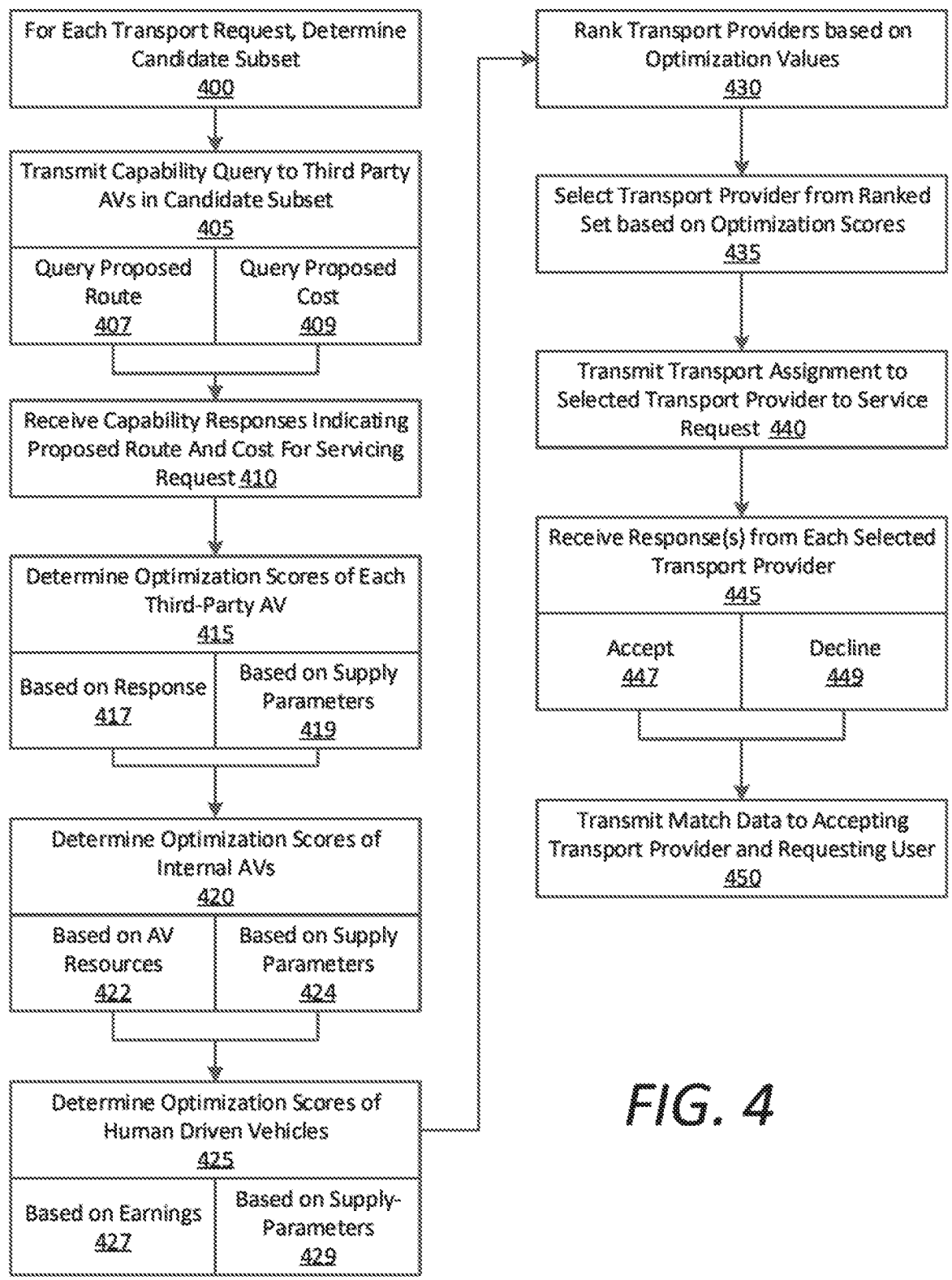

FIGS. 3 and 4 are flow charts describing example methods of determining optimization scores for transport vehicles and selecting transport providers to service transport requests, according to examples described herein. In the below descriptions of FIGS. 3 and 4, reference may be made to reference characters representing like features shown and described with respect to FIGS. 1 and 2. Furthermore, the steps and processes described with respect to FIGS. 3 and 4 below may be performed by an example network computing system 100, as described herein with respect to FIG. 1. Referring to FIG. 3, the computing system 100 can receive location data from transport providers operating throughout a given service region (300). As described herein the transport providers can comprise any number of human-driven vehicles 194 (302), internal AVs 192 (303), and third-party AVs 196 (304). The computing system 100 can further receive transport requests from user devices 185 of requesting users 180 (305). Each transport request can indicate a pick-up location or current location of the user 180 (307) and a destination (309).

In various examples, for each received transport request, the computing system 100 can determine a subset of the transport providers as candidates to service the transport request (310). For each transport provider in the subset, the computing system 100 can determine an optimization score for the transport provider, if the transport provider were selected to service the transport request (315). Based on the optimization score of each transport provider in the subset, the computing system 100 can select a transport provider to service the transport request (320). The computing system 100 may then transmit a transport invitation or assignment to the selected transport provider to service the transport request (325).

FIG. 4 is another flow chart describing a method of determining optimization scores for transport vehicles and selecting transport providers to service transport requests. Any step described with respect to either FIG. 3 or FIG. 4 may complement or replace any other step described. Furthermore, the steps provided in FIGS. 3 and 4 need not be performed in the order(s) described but may rather be performed in any suitable order. Referring to FIG. 4, for each received transport request from the user device 185 of a requesting user 180, the network computing system 100 can determine a subset of candidate transport providers (400). For example, the network computing system 100 can identify a certain number of available transport providers within a certain distance or estimated time from the user's current location or an inputted pick-up location (e.g., a radius of two miles). As described herein, the candidate subset can comprise a number of internal AVs 192, third-party AVs 196, and/or human-driven vehicles 194.

In various examples, the network computing system 100 can transmit a capability query to each third-party AV 196 in the candidate subset of transport providers (405). The capability query can identify the pick-up location and destination, and can query the third-party AV 196 for a proposed route (407) and a proposed cost (409) for servicing the transport request. The computing system 100 may then receive capability responses from each of the third-party AVs 196 in the candidate subset of transport providers, where the capability responses include a proposed route and a cost for servicing the transport request (410). In certain examples, the computing system 100 can implement an auction process for the third-party AVs (e.g., a Dutch auction) to exert downward pressure on the cost of servicing the transport request. The computing system 100 can the determine an optimization score for each third-party AV (415). In various examples, the computing system 100 can determine the optimization score of each third-party AV based, at least in part, on the proposed route and cost indicated in the capability response (417). Additionally, the computing system 100 can determine the optimization score of each third-party AV based on supply-demand parameters described herein (419). For example, the computing system 100 can determine the transport supply-demand conditions in the sub-region in which the third-party AV is currently located and attribute a weighted value to the sub-region depending on a level of oversupply or undersupply of the sub-region. The optimization score of the third-party AV can factor in the overall supply/demand effect of moving the third-party AV from its current location to the pick-up location or destination indicated in the transport request.

According to examples described herein, the computing system 100 can further determine an optimization score for each internal AV in the candidate set of transport providers (420). The computing system 100 can also determine the optimization scores of the internal AVs based on the supply-demand parameters described above (424). In addition, since the internal AVs are managed by the computing system 100, the computing system 100 may access details of each internal AV, such as which software version(s) the internal AV implements, and the hardware resources of the internal AV (e.g., sensor systems, computing systems, etc.). In various implementations, the computing system 100 can attribute weighted values corresponding to these known AV resources, and factor these weighted values into the optimization score determination. For example, the transport service entity of the common transport service platform managed by the network computing system 100 can attribute business or academic value in testing or confirming software updates, hardware upgrades, and/or feasible routes for its internal AVs. Accordingly, the optimization score for the internal AVs may factor in such indirect values.

In certain implementations, the computing system 100 can further determine an optimization score of each human-driven vehicle in the candidate set (425). The computing system 100 can determine the optimization score based on the supply-demand parameters described herein (429), as well as factoring in the predetermined or expected earnings of the driver (427). Once an optimization score is determined for each of the transport providers in the candidate subset, the computing system 100 can rank the transport providers based on the optimization scores (430), and then select a transport provider (e.g., a transport provider having a highest optimization score) to service the transport request from the ranked set of transport providers (435).

The computing system 100 may then transmit a transport assignment to the selected transport provider to enable the selected transport provider to service the request (440). In certain examples, the transport provider may have the option to accept or decline the transport assignment. In such examples, the computing system 100 may receive a response from the selected transport provider (445), in which the response can indicate whether the selected transport provider has accepted (447) or declined (449) the transport request. If the transport provider declines, then the computing system 100 can either perform the selection process again from the beginning (starting at step (400)), or can transmit a transport assignment to a next best option in the ranked set. Once accepted, the computing system 100 can transmit match data to the accepting transport provider and the requesting user to indicate the match and that an upcoming rendezvous is to be expected.

Accordingly, the network computing system 100 can manage and coordinate the on-demand transport servicing platform in the manner(s) described above. In doing so, the network computing system 100 can facilitate third-party AVs 196 on the platform and move transport supply between sub-regions to increase homogeneity in user experience to requesting users 180.

Hardware Diagrams

Figure 5:
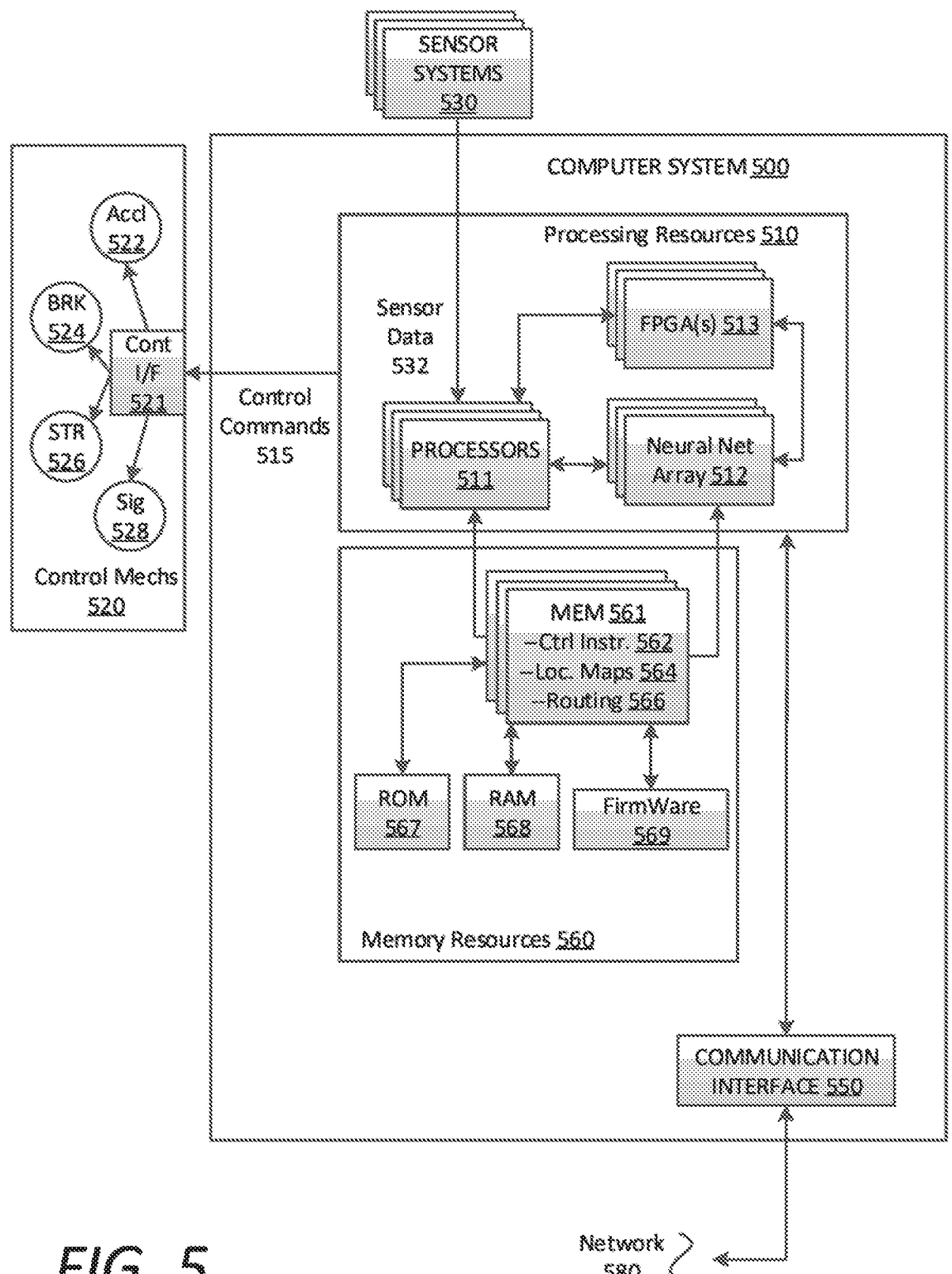
FIG. 5 is a block diagram illustrating a computer system for an AV upon which examples described herein may be implemented.

FIG. 5 is a block diagram illustrating a computer system upon which example AV processing systems described herein may be implemented. The computer system 500 can be implemented using a number of processing resources 510, which can comprise processors 511, field programmable gate arrays (FPGAs) 513. In some aspects, any number of processors 511 and/or FPGAs 513 of the computer system 500 can be utilized as components of a neural network array 512 implementing one or more machine learning models and utilizing road network maps stored in memory 561 of the computer system 500. In the context of FIG. 2, various aspects and components of the AV control system 220 can be implemented using one or more components of the computer system 500 shown in FIG. 5.

According to some examples, the computer system 500 may be implemented within an autonomous vehicle (AV) with software and hardware resources such as described with examples of FIG. 2. In an example shown, the computer system 500 can be distributed spatially into various regions of the AV, with various aspects integrated with other components of the AV itself. For example, the processing resources 510 and/or memory resources 560 can be provided in a cargo space of the AV. The various processing resources 510 of the computer system 500 can also execute control instructions 562 using microprocessors 511, FPGAs 513, a neural network array 512, or any combination of the same.

In an example of FIG. 5, the computer system 500 can include a communication interface 550 that can enable communications over a network 580. In one implementation, the communication interface 550 can also provide a data bus or other local links to electro-mechanical interfaces of the vehicle, such as wireless or wired links to and from control mechanisms 520 (e.g., via a control interface 521), sensor systems 530, and can further provide a network link to a backend transport management system or a remote assistance system (implemented on one or more datacenters) over one or more networks 580.

The memory resources 560 can include, for example, main memory 561, a read-only memory (ROM) 567, storage device, and cache resources. The main memory 561 of memory resources 560 can include random access memory (RAM) 568 or other dynamic storage device, for storing information and instructions which are executable by the processing resources 510 of the computer system 500. The processing resources 510 can execute instructions for processing information stored with the main memory 561 of the memory resources 560. The main memory 561 can also store temporary variables or other intermediate information which can be used during execution of instructions by the processing resources 510. The memory resources 560 can also include ROM 567 or other static storage device for storing static information and instructions for the processing resources 510. The memory resources 560 can also include other forms of memory devices and components, such as a magnetic disk or optical disk, for purpose of storing information and instructions for use by the processing resources 510. The computer system 500 can further be implemented using any combination of volatile and/or non-volatile memory, such as flash memory, PROM, EPROM, EEPROM (e.g., storing firmware 569), DRAM, cache resources, hard disk drives, and/or solid-state drives.

The memory 561 may also store localization maps 564 in which the processing resources 510—executing the control instructions 562—can continuously compare to sensor data from the various sensor systems 530 of the AV. Execution of the control instructions 562 can cause the processing resources 510 to generate control commands 515 in order to autonomously operate the AV's acceleration 522, braking 524, steering 526, and signaling systems 528 (collectively, the control mechanisms 520). Thus, in executing the control instructions 562, the processing resources 510 can receive sensor data 532 from the sensor systems 530, dynamically compare the sensor data 532 to a current localization map 564, and generate control commands 515 for operative control over the acceleration, steering, and braking of the AV. The processing resources 510 may then transmit the control commands 515 to one or more control interfaces 521 of the control mechanisms 520 to autonomously operate the AV through road traffic on roads and highways, as described throughout the present disclosure.

The memory 561 may also store routing information 566 that the processing resources 510 can utilize to determine routes for the AV to any given destination. In certain examples described herein, the routing information 566 can further be provided to a network computing system 100 to enable the network computing system 100 to select or filter out the AV as a candidate to service transport requests.

Figure 6:
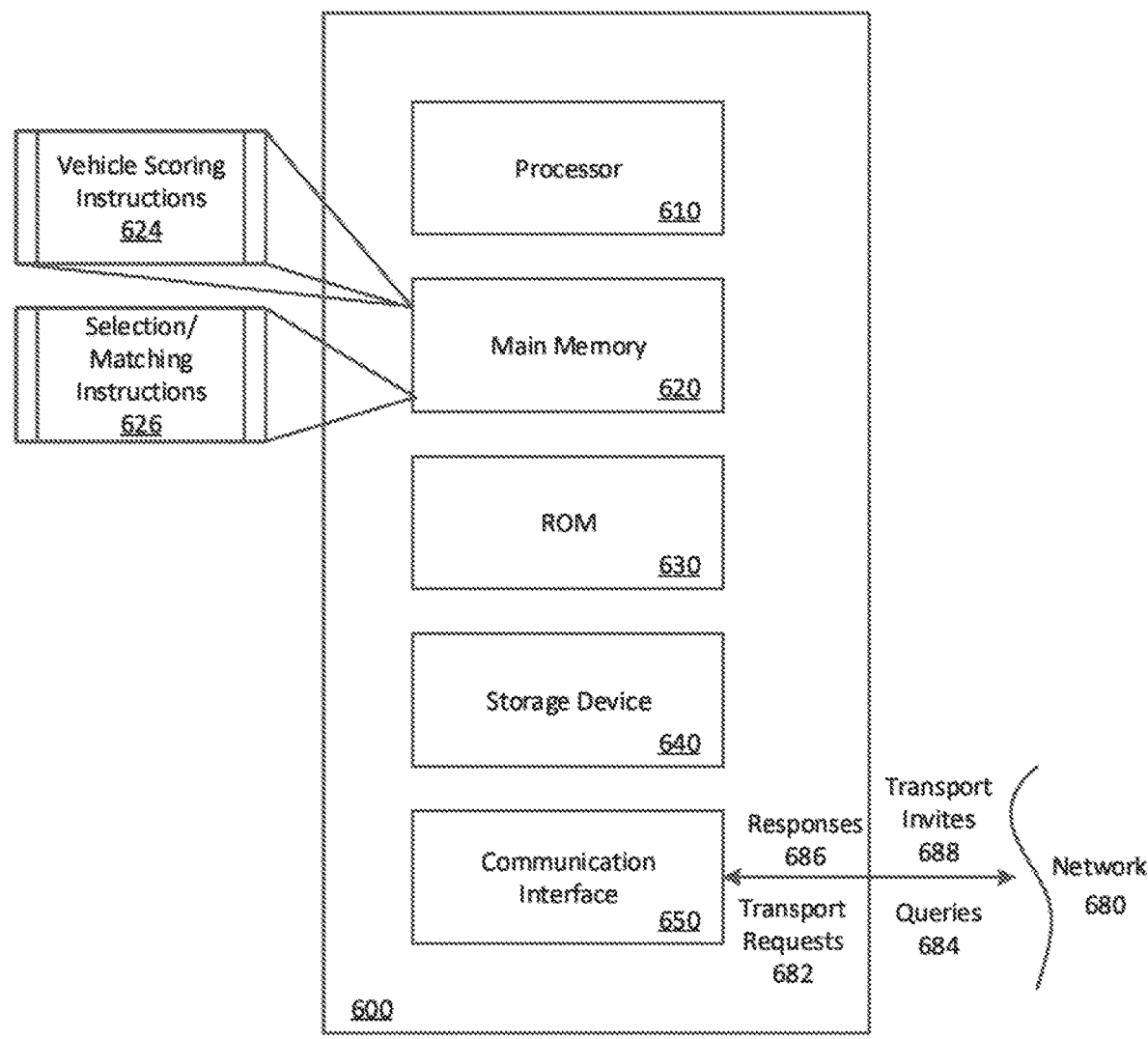
FIG. 6 is a block diagram illustrating a computer system for network computing system managing an on-demand transport servicing platform, upon which examples escribed herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing transportation services. In the context of FIGS. 1 and 2, the network computing system 100, 290 may be implemented using a computer system 600 such as described by FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate over one or more networks 680 (e.g., cellular network) through use of the network link (wireless or wired). Using the network link, the computer system 600 can communicate with one or more computing devices, one or more servers, and/or one or more autonomous vehicles. The executable instructions stored in the memory 620 can include selection and matching instructions 626, which enables the computer system 600 to receive transport requests 682 from drivers and AVs operating throughout the given region. In some aspects, execution of the selection and matching instructions 626 can cause the computer system 600 to identify candidate transport providers, transmit capability queries 684 to those providers, receive capability responses 686, filter the candidate sets, and transmit transport invitations to matched transport providers. The executable instructions stored in the memory 620 can further include vehicle scoring instructions 624, which the processor 610 executes to weigh the various utility metrics of each candidate transport provider, and determine an optimization score for that transport provider. The computing system 600 may then rank and/or select a transport provider to service a given transport request 682 based on the determined optimization scores.

The processor 610 is configured with software and/or other logic to perform one or more processes, steps and other functions described with implementations, such as described with respect to FIGS. 1-4, and elsewhere in the present application. Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features or examples make no mention of the particular feature. Thus, the absence of describing combinations should not preclude claiming rights to such combinations.

What is claimed is:

1. A transport service entity computing system comprising:
   one or more processors; and
   one or more memory resources storing instructions that, when executed by the one or more processors, cause the one or more processors to execute operations comprising:
   receiving a transport request from a computing device associated with a requesting user;
   transmitting a capability query based on the transport request to a third-party computing system of a third-party entity;
   receiving a response from the third-party computing system, the response indicating a capability of one or more third-party autonomous vehicles (AVs) to respond to the transport request received from the computing device;
   selecting the third-party entity to service the transport request based at least in part on the response from the third-party computing system; and
   causing a third-party autonomous vehicle (AV) of the third-party entity to begin servicing the transport request.

2. The computing system of claim 1, wherein the response comprises a proposed cost for the third-party AV to complete the transport request.

3. The computing system of claim 1, wherein the operations further comprise:
   transmitting a confirmation query to the third-party AV to specifically determine whether the third-party AV can service the transportation request.

4. The computing system of claim 1, wherein the operations further comprise:
   compiling third-party capability data regarding a capability of a third-party fleet of the third-party entity including the one or more third-party AVs in servicing individual transport requests, wherein selecting the third-party entity comprises selecting the third-party fleet of the third-party entity.

5. The computing system of claim 4, wherein:
   the third-party capability data indicates a safety record for the third-party fleet; and
   the operations further comprise, based on the safety record, determining whether the third-party fleet is qualified as a candidate for a further transport request.

6. The computing system of claim 4, wherein:
   the third-party capability data indicates autonomy road networks that the third-party fleet is capable of servicing; and
   the operations further comprise determining whether the third-party fleet is qualified as a candidate for a further transport request based on whether the further transport request requires travel outside of the autonomy road networks.

7. The computing system of claim 1, wherein the operations further comprise:
   storing on-board routing information for a third-party fleet of the third-party entity in a database, the on-board routing information indicating routes, roads, or lanes upon which the third-party fleet may operate within a transport service region.

8. The computing system of claim 1, wherein receiving the transport request comprises receiving the transport request via a communication interface communicating with computing devices of requesting users in a transport region, the transport request describing a pick-up location and a destination in the transport region associated with the transport request.

9. The computing system of claim 1, wherein the operations further comprise:
determining a subset of transport providers to service the transport request, the subset of the transport providers including the third-party entity; and
generating a ranking of the subset of transport providers based at least in part on an optimization score associated with each respective transport provider, the selecting of the third-party entity to service the transport request being based on the ranking.

10. The computing system of claim 1, wherein selecting the third-party entity is based at least in part on an estimated time of arrival to a pick-up location for the transport request or an estimated time of drop-off of at a destination for the transport request.

11. A computer-implemented method for managing transport providers, the method comprising:
receiving a transport request from a computing device associated with a requesting user;
transmitting a capability query based on the transport request to a third-party computing system of a third-party entity;
receiving a response from the third-party computing system, the response indicating a capability of one or more third-party autonomous vehicles (AVs) to respond to the transport request received from the computing device;
selecting the third-party entity to service the transport request based at least in part on the response from the third-party computing system; and
causing a third-party autonomous vehicle (AV) of the third-party entity to begin servicing the transport request.

12. The method of claim 11, wherein the response comprises a proposed cost for the third-party AV to complete the transport request.

13. The method of claim 11, further comprising:
transmitting a confirmation query to the third-party AV to specifically determine whether the third-party AV can service the transportation request.

14. The method of claim 11, further comprising:
compiling third-party capability data regarding a capability of a third-party fleet of the third-party entity including the one or more third-party AVs in servicing individual transport requests, wherein selecting the third-party entity comprises selecting the third-party fleet of the third-party entity.

15. The method of claim 14, wherein:
the third-party capability data indicates a safety record for the third-party fleet; and
the operations further comprise, based on the safety record, determining whether the third-party fleet is qualified as a candidate for a further transport request.

16. The method of claim 14, wherein:
the third-party capability data indicates autonomy road networks that the third-party fleet is capable of servicing; and
the operations further comprise determining whether the third-party fleet is qualified as a candidate for a further transport request based on whether the further transport request requires travel outside of the autonomy road networks.

17. The method of claim 11, further comprising:
storing on-board routing information for a third-party fleet of the third-party entity in a database, the on-board routing information indicating routes, roads, or lanes upon which the third-party fleet may operate within a transport service region.

18. The method of claim 11, wherein receiving the transport request comprises receiving the transport request via a communication interface communicating with computing devices of requesting users in a transport region, the transport request describing a pick-up location and a destination in the transport region associated with the transport request.

19. The method of claim 11, further comprising:
determining a subset of transport providers to service the transport request, the subset of the transport providers including the third-party entity; and
generating a ranking of the subset of transport providers based at least in part on an optimization score associated with each respective transport provider, the selecting of the third-party entity to service the transport request being based on the ranking.

20. A non-transitory storage medium comprising instructions thereon that, when executed by at least one processor, cause the at least one processor to perform operations comprising:
receiving a transport request from a computing device associated with a requesting user;
transmitting a capability query based on the transport request to a third-party computing system of a third-party entity;
receiving a response from the third-party computing system, the response indicating a capability of one or more third-party autonomous vehicles (AVs) to respond to the transport request received from the computing device;
selecting the third-party entity to service the transport request based at least in part on the response from the third-party computing system; and
causing a third-party autonomous vehicle (AV) of the third-party entity to begin servicing the transport request.

* * * * *